United States Patent [19]
Cotter

[11] 3,707,772
[45] Jan. 2, 1973

[54] INCLINATION INDICATOR
[75] Inventor: Ashby M. Cotter, Manchester, Tenn.
[73] Assignee: Roy Harper, Manchester, Tenn.; a part interest
[22] Filed: June 30, 1971
[21] Appl. No.: 158,410

[52] U.S. Cl. .................................33/373, 33/395
[51] Int. Cl. ..............................................G01c 9/16
[58] Field of Search.......................33/370–373, 375, 33/397

*Primary Examiner*—Leonard Forman
*Assistant Examiner*—Dennis A. Dearing
*Attorney*—Harrington A. Lackey

[57] ABSTRACT

An inclinometer for simultaneously measuring inclination in two perpendicularly related planes having a first ring member rotatably mounted to a base member for rotation about an axis normal to the longitudinal axis of the base and a second ring member, with a pendulum pivotally mounted for movement in the plane thereof, pivotally mounted concentrically of the first ring member for movement about an axis perpendicular to the normal axis.

7 Claims, 3 Drawing Figures

PATENTED JAN 2 1973

3,707,772

INVENTOR:
ASHBY M. COTTER
BY Harrington A. Lackey
ATTORNEY

INCLINATION INDICATOR

This invention relates to a device for indicating the inclination of an article with respect to either or both longitudinal and transverse axes.

One object of this invention is to provide a device particularly adapted for leveling and measuring the angular positions of pipes or tubular conduits.

Another object of this invention is to provide a device convertible to indicate the inclination of an object in one or two dimensions, and to also function as a level.

Another object of this invention is to provide a combination level and inclination indicator having an element laterally extensible to an operative position for measurement in two dimensions and collapsible to an operative position for measurement in one dimension or for economy of storage space.

A further object of this invention is to provide a device which may be secured to a pipe for indicating its longitudinal and lateral inclination while the pipe is in the process of being bent.

Further objects and advantages of the invention will be apparent from the following description taken in conjunction with the drawings, wherein.

Figure 1:
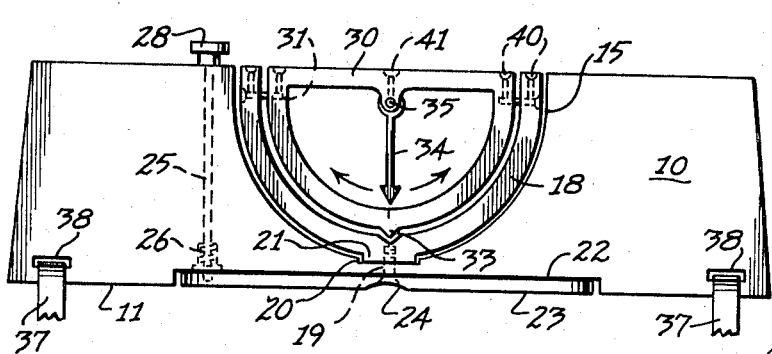
FIG. 1 is a side elevation of the invention in one operative position for indicating single-dimensional inclinations.

Referring now to the drawings in more detail, the device comprises a solid stock 10 of any convenient material which is of a uniform height and thickness. The bottom edge or surface 11 has an arcuate cross-section which is adapted to fit longitudinally on a cylindrical surface such as a pipe or tubular conduit 12. The side edges of the bottom surface 11 are parallel and lie in a plane normal to the height of the stock 10. Thus, the bottom surface 11 may rest flush upon a flat surface with the stock in an upright position, so that the device is adaptable for measuring the inclinations of cylindrical or flat surfaces.

A semi-circular recess 15 is formed in the middle portion of the stock 10. The recess 15 has a thickness equal to the thickness of the stock 10, and opens through the upper edge of the stock. Moreover, the recess 15 is formed symmetrically about an axis which is parallel to the height of the stock 10 and normal to the bottom surface 11. Graduations 16 are indicated from zero degrees at the intersection of the normal axis with the recess 15 upwardly to 90° on each side of the recess.

A first semi-circular ring member 18 is mounted to rotate about its symmetrical axis, which is coincident with the normal axis of the recess 15, by means of the pivot pin or bolt 19.

The recess 15 is provided with a notch 20 to rotatably receive a boss or projection 21 depending from the bottom of the ring member 18. A longitudinal recess 22 of uniform height and width is formed in the bottom surface 11. Adapted to be received within the recess 22 is an elongated arm 23 of slightly less height and length than the recess 22. The center of the arm 23 is fixed to one end of the lower end of the pivot bolt 19, which extends through a mating opening in the stock 10 and is fixed at its opposite end within the boss 21. Thus, as best disclosed in FIGS. 1 and 2, the ring member 18 is fixed through the bolt 19 to the arm 23, so that both rotate in the same plane and relative to the stock 10. When the ring member 18 and the arm 23 are longitudinally aligned within their respective recesses 15 and 22, the bottom surface of the arm 23 has the same arcuate shape and provides a continuation of the bottom surface 11 of the stock 10. However, as disclosed in FIGS. 1 and 2, a transverse arcuate groove 24, having a radius substantially equal to that of the arcuate bottom surface 11, is formed in the bottom middle surface of the arm 23, so that, either in the longitudinal position of FIG. 1, or the transverse position of FIG. 2, the bottom surface of the arm 23 will align with the bottom surface 11 of the stock to fit on a cylindrical surface 12.

Figure 3:
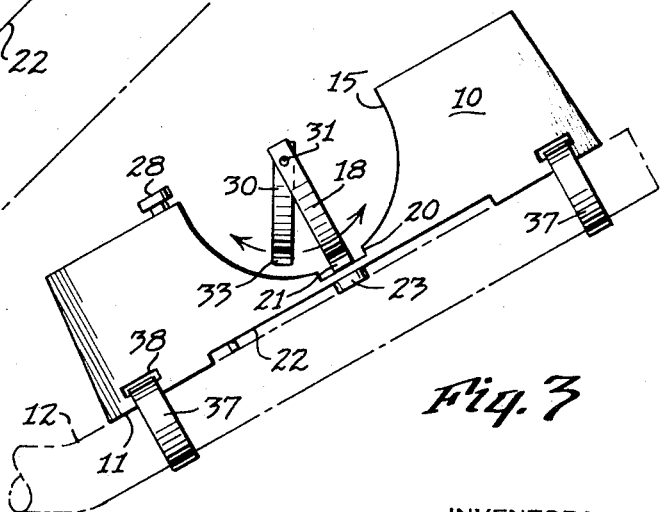
FIG. 3 is a side elevational view of the invention disclosed in FIG. 2 in an angular position.

When the arm 23 is in its longitudinal position disclosed in FIGS. 1 and 3, it may be locked by means of a plunger 25 slidably received to reciprocate through the height of the stock 10, and biased by a spring 26 into the mating opening 27 adjacent one end of the arm 23. The upper end of the plunger 25 is provided with a handle or knob 28 to release the plunger from its mating hole 27 so that the arm 23 may be swung to its transverse position, and also to limit the downward movement of the plunger 25.

A second semi-circular ring member 30 is concentrically mounted within the first ring member 18, and is pivotally supported within the ring member 18 adjacent its upper edges by means of the pins or hinges 31. The hinges 31 permit the ring member 30, which is provided with angular graduations 32 beginning with 0° on its concentric axis and extending arcuately upwardly in both directions to 90°, to swing about an axis normal to the rotatable axis of and out of the plane of the ring member 18. Detent or pointer 33 is formed on the bottom surface of the ring member 30 coaxial with its symmetrical axis and adapted to register with the graduations 16 on the semi-circular recess 15 when the ring member 18 is in its transverse position disclosed in FIG. 2. A second elongated pointer 34 is journaled at its upper end by means of a pin 35 rotatably mounted in the upper portion of the ring member 30 along an axis normal to the axis of the hinges 31 so that the pointer 34 will freely swing within the plane of the ring member 30 and register with the graduations 32.

In order to secure the stock 10 to an article for which a measurement of inclination is desired, such as a pipe 12, or even a structural member having a flat surface, straps 37 are received through appropriate apertures 38 at opposite ends of the stock 10 so that the straps 37 may extend around and be secured to the article.

Screws 40 are received in mating openings within the respective ring members 18 and 30, in order to secure the rotatable pins 31 in place, and also to provide a means of lubricating the pin and to prevent dust from entering through the lubricating holes. Screws 41 have the same function with respect to the pivot pin 35.

The operation of the invention is as follows:

If the operator of the device desires to measure the inclination of a pipe 12, or to bend the pipe 12 to a certain position at an angle to the horizontal, the stock 10 is longitudinally secured to the pipe 12 by means of the straps 37. If the elements of the device are in the compact position disclosed in FIG. 1, the knob 28 is lifted and the arm 23 is rotated through 90° to assume the transverse position of FIG. 2. In rotating the arm 23 to the transverse position, the ring members 18 and 30 will also be rotated through 90° and will lie in the same transverse plane as the arm 23. If the pipe 12 is level, the pointer 33 will register with the 0° graduation 16 in the recess 15, and the pointer 34 will register with the 0° graduation 32 in the ring member 30. If the pipe 12 is bent to the position disclosed in FIG. 3, without twisting, the ring member 30 will swing about its hinges 31 by means of gravity to assume a truly vertical position, and the pointer 33 will register with the graduation 16 which indicates the angular position of the bent portion of the pipe 12 with respect to the horizontal, in accordance with the theorem of plane geometry that angles whose sides are respectively perpendicular are equal. In the position disclosed in FIG. 3, the pointer 34 will still register with the 0° graduation 32 in the ring member 30. However, if during the bending of the pipe 12, the bent portion of the pipe is twisted so that the stock 10 is laterally tilted, the pointer 34 will swing toward the direction of twisting and will indicate the degree of twisting by registering with the appropriate graduation 32. Thus, the bending of the pipe 12 can be accurately controlled at all times by means of the double readings of the pointers 33 and 34 on the respective scales 16 and 32.

Figure 2:
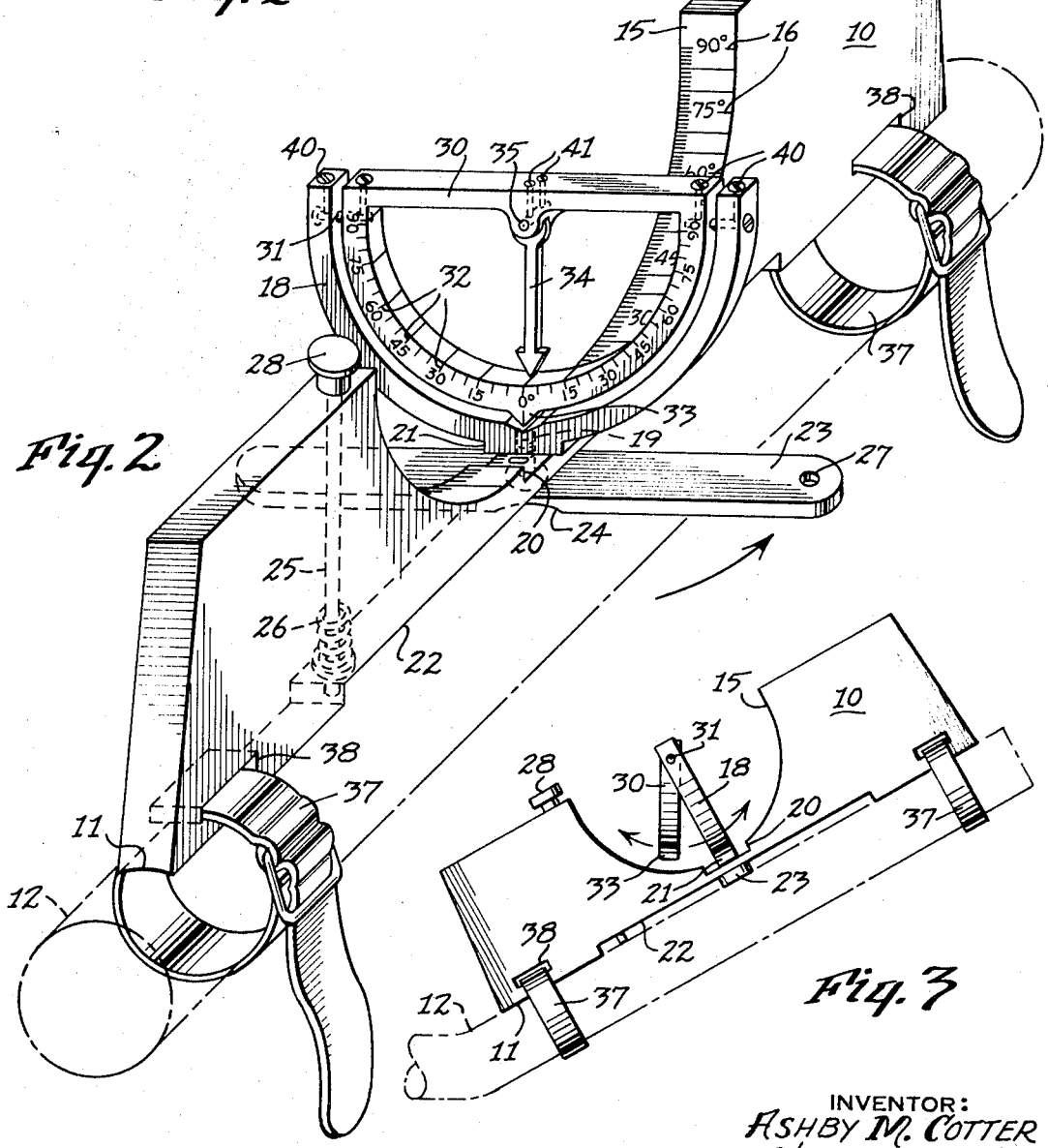
FIG. 2 is a perspective view of the invention in a second level operative position for indicating two-dimensional inclinations.

It will also be understood that the device may be used as a level as well as an inclination indicator, in one dimension, as indicated in FIG. 1, or in two dimensions as indicated in FIGS. 2 and 3.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. An inclination indicator comprising a stock having a longitudinal base adapted to fit the surface whose inclination is desired, a substantially semi-circular recess formed in said stock and symmetrically about an axis normal to the longitudinal axis of said base, said recess having first angular graduations, a first semi-circular ring member mounted concentrically within said recess, means mounting said first ring member for rotation about said normal axis, a second semicircular ring member having second angular graduations thereon, means pivotally mounting said second ring member concentrically within said first ring member to swing freely about an axis perpendicular to said normal axis, a pointer, and means for pivotally supporting said pointer to freely swing within the plane of said second ring member to register with the said second graduations.

2. The invention according to claim 1 in which said longitudinal base comprises a surface of uniform thickness and of arcuate cross section having parallel side edges lying in a plane perpendicular to said normal axis.

3. The invention according to claim 2 in which a portion of said base intersecting said normal axis comprises a longitudinal recess of the same thickness as said base, a longitudinal arm of substantially the same length and width as said longitudinal recess and adapted to be received in said longitudinal recess, the bottom surface of said arm having the same configuration as the base of said stock and adapted to align with said base when said arm is longitudinally received in said longitudinal recess, and said means mounting said first ring member comprising means mounting said arm and said first ring member for rotatable movement as a unit about said normal axis.

4. The invention according to claim 3 in which the means for pivotally connecting said arm to said first ring member comprises a pin rotatably extending through an intervening portion of said stock, one end of said pin being fixed in said first ring member and the other end of said pin being fixed to said arm.

5. The invention according to claim 3 in which means are provided for locking said arm longitudinally within said longitudinal recess.

6. The invention according to claim 5 in which the means for locking said arm in said longitudinal recess comprises a hole in the upper surface of said arm, a reciprocable pin adapted to mate with said hole when said arm is longitudinally aligned in said longitudinal recess, and means to bias said pin into said hole.

7. The invention according to claim 2 in which means are provided for securing said arcuate base flush against and in longitudinal alignment with a cylindrical surface, for which a measurement of inclination is desired.

* * * * *